Sept. 8, 1931.  K. B. McEACHRON  1,822,742

DISCHARGE DEVICE AND RESISTANCE MATERIAL

Filed June 13, 1927  8 Sheets-Sheet 1

Inventor:
Karl B. McEachron,
by *[signature]*
His Attorney.

Sept. 8, 1931.  K. B. McEACHRON  1,822,742
DISCHARGE DEVICE AND RESISTANCE MATERIAL
Filed June 13, 1927  8 Sheets-Sheet 2

Inventor:
Karl B. McEachron,
by *Alexander ...*
His Attorney.

Inventor:
Karl B. McEachron,
by
His Attorney.

Sept. 8, 1931.  K. B. McEACHRON  1,822,742
DISCHARGE DEVICE AND RESISTANCE MATERIAL
Filed June 13, 1927   8 Sheets-Sheet 4

Inventor:
Karl B. McEachron,
by *Alexander F. Lunt*
His Attorney.

Sept. 8, 1931.    K. B. McEACHRON    1,822,742
DISCHARGE DEVICE AND RESISTANCE MATERIAL
Filed June 13, 1927    8 Sheets-Sheet 5

Inventor:
Karl B. McEachron,
by *Alexander S. Lunt*
His Attorney.

Sept. 8, 1931.　　　K. B. McEACHRON　　　1,822,742
DISCHARGE DEVICE AND RESISTANCE MATERIAL
Filed June 13, 1927　　　8 Sheets-Sheet 6

Inventor:
Karl B. McEachron,
by　*[signature]*
His Attorney.

Inventor:
Karl B. McEachron,
by *Alexander D. Lunt*
His Attorney.

Patented Sept. 8, 1931

1,822,742

UNITED STATES PATENT OFFICE

KARL B. McEACHRON, OF PITTSFIELD, MASSACHUSETTS, ASSIGNOR TO GENERAL ELECTRIC COMPANY, A CORPORATION OF NEW YORK

DISCHARGE DEVICE AND RESISTANCE MATERIAL

Application filed June 13, 1927. Serial No. 198,512.

My invention relates to discharge devices in which a material is used having the characteristic that when placed in circuit with a source of electric potential its resistance falls with increase of potential in the circuit. My invention relates also to such material.

More particularly my invention relates to a material of the foregoing character having the characteristic that its resistance varies in accordance to an exponential function of the current which is forced through it. The invention relates for example to silicon carbide which has a hyperbolic resistance ampere characteristic. It relates to mixtures of silicon carbide and carbon, or to silicon carbide mixed with other conducting materials such as tungsten, molybdenum and the like. The invention also relates to mixtures such as silicon carbide and galena, and the like, or to silicon carbide and clay, glass, and the like.

The material of the invention is especially adapted for use as, or in connection with, discharge devices such as arresters and the like for the reason that in addition to having a hyberbolic characteristic, it possesses the characteristic that it has no time lag, or a time lag that is negligible and is substantially as effective when confronted with electric voltages of steep wave front as with voltages of more moderate wave front. The material possesses the characteristic that when confronted with substantial overvoltages it permits corresponding volumes of current to discharge, the slope of which discharge follows the slope of the overvoltage wave. Furthermore, and as the overvoltage subsides, the resistance increases at the rate that the overvoltage disappears, until the normal voltage of the line is restored, when substantially no current or negligible leakage current will pass.

A general equation derived from Ohm's Law for the material of the invention may be written as follows:

$$RI^a = C \quad (1)$$

In this equation "a", which I will term the exponent, represents the slope of the resistance-ampere curve with reference to log-log-co-ordinates and $c$, which I will term the constant, represents the resistance when the current is of an assumed value such as one ampere. It is one of the objects of the invention to provide a material of the foregoing character having an exponent which approaches one, that is, having a resistance-ampere characteristic the slope of which approaches one.

It is also an object to provide a material of the foregoing character which has substantially the same resistance value for a given value of current, regardless of whether the current arrives at such given value by an increase or by a decrease in current density. It is also an object to regulate the exponent and constant of the material by the process of the invention and to shift the curve of its characteristic so as to bring it within the operating range of the invention.

In this specification I may find it convenient to refer to the material in terms of a unit which I shall term a "standard unit" for the purpose, such unit having the form and dimensions of a disc 2.5 inches in diameter and 0.125 inches (about 0.32 cm.) thick. I merely select these dimensions because they are well known in the art and may enable the invention to be more readily understood. I will also have occasion to refer to material of "standard make", which material will be hereinafter defined.

The details of the invention will now follow, reference being had to the accompanying drawings. Some of the figures show curves with reference to rectilinear co-ordinates and some with reference to logarithmic co-ordinates. Where logarithmic co-ordinates are used it will be so stated. Otherwise rectilinear co-ordinates will be understood. The abbreviation "log-log" will be used to designate the term logarithmic.

Figure 9:
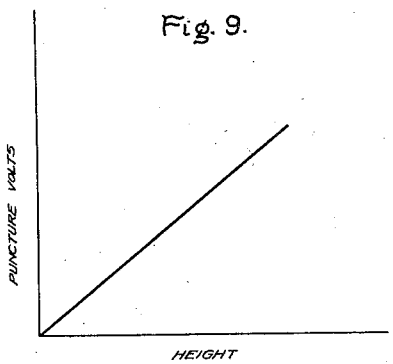

Fig. 9 shows the relation between puncture voltage and height of stack of standard units of the material of the invention, of standard make. The material of the invention has exponent and constant so related that the stack has a reasonable margin of safety when it is operating to discharge the full volume of current for which it is designed, as for example, with a current discharge of 1000 amperes through the unit.

Figure 10:
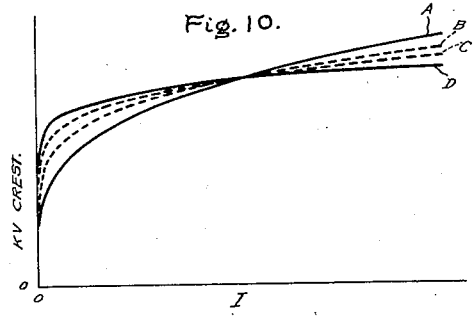

Fig. 10 shows EI curves A— B— C— D— of four different materials of the invention, $a$, $b$, $c$, $d$, having hyperbolic RI characteristics.

Figure 11:
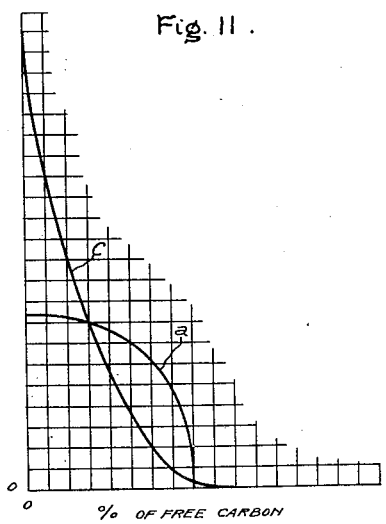

Fig. 11 shows the effect of free carbon on $a$ and $c$ of carborundum or silicon carbide. In this case carborundum was roasted to reduce the free carbon content to 0.2% and graphite was then added to obtain the various percentages desired. Carborundum can be considered as a composition of a silicon carbide alone or with some free carbon or with some other ingredient such as silicon— or silica or a mixture of all.

Figure 12:
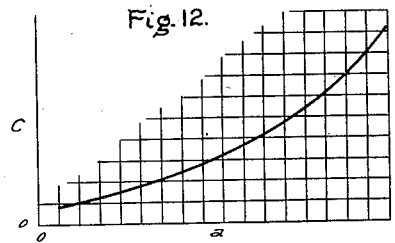

Fig. 12 shows an arbitrary relation of constant and exponent for standard units of the materials $a$— $b$— $c$— $d$—, the curves of which are shown in Fig. 10, the constants and exponents of the corresponding materials being as follows:

| Material | Exponent | Constant |
|---|---|---|
| a | .74 | 120 |
| b | .82 | 205 |
| c | .87 | 285 |
| d | .91 | 370 |

Figure 13:
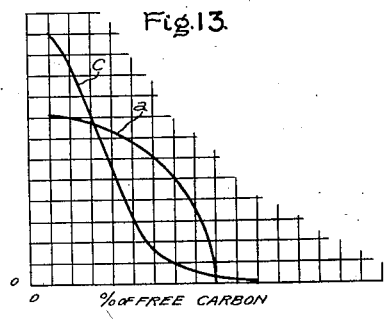

Fig. 13 is similar to Fig. 11 and shows the effect of free carbon on exponent $a$ and on constant $c$ of the material. In this case the carbon variation was obtained, not by roasting, and then adding graphite, but by mixing carborundum materials having different percentages of free carbon or by adding free carbon to the commercial material.

Figure 14:
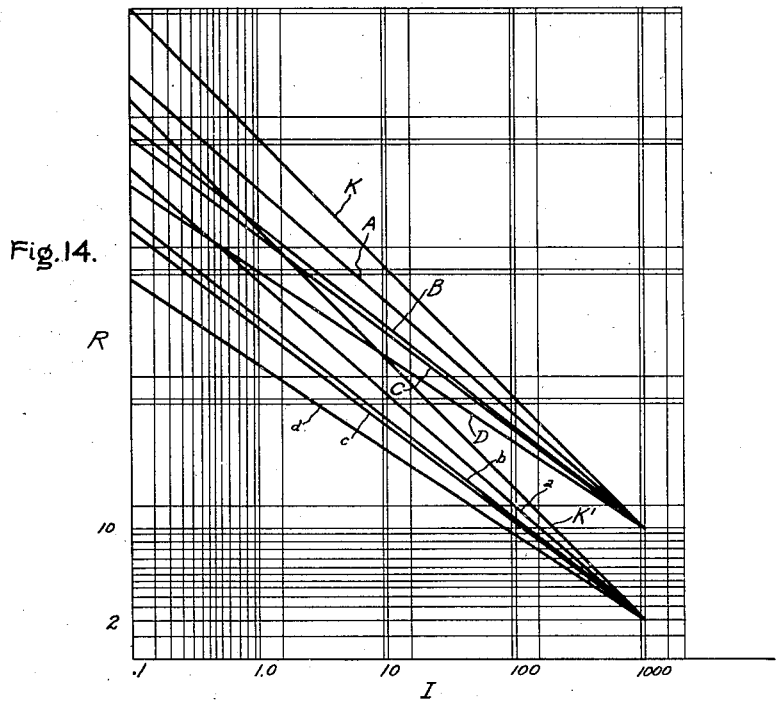

Fig. 14 shows, with reference to log-log co-ordinates, RI curves A—, B—, C—, D, of discharge devices of the materials $a$— $b$— $c$— $d$— of Fig. 10. It also shows, for comparison, a curve K of a material the slope of which is 1. All of these curves are shown passing through the 10 kv.—1000 ampere point. The lower curves $a$— $b$— $c$— $d$ and K′ are curves of the same materials respectively, the stacks of which are 1/5 the length of the corresponding ones A—, B—, C—, D above.

Figures 15, 16:
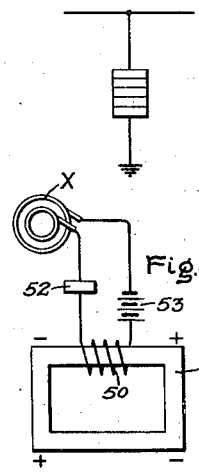

Fig. 15 is a diagrammatic representation of a form of discharge device or arrester of the invention consisting of a stack of units of material of the invention connected to a power line.

Fig. 16 shows an arrester of the same sort as in Fig. 15 connected to the same sort of line but with a spark gap interposed.

Figure 17:
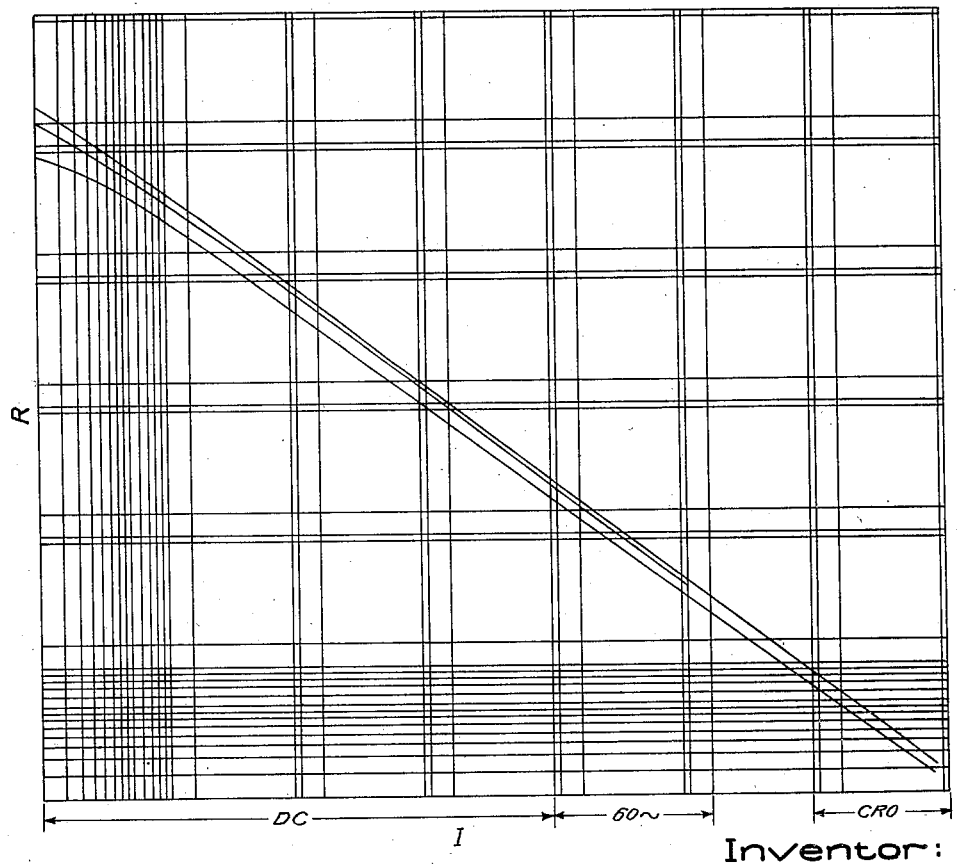

Fig. 17 shows three sets of readings in connection with a form of material of the invention with respect to resistance as ordinates and amperes as abscissa, one set having been taken with direct current on the potentiometer, one set taken at sixty cycles with the electromagnetic oscillograph, and the third set taken on the cathode ray oscillograph on a four micro-second wave, all of which readings fall along a straight line indicating thereby the absence of time lag in the material or illustrating the ability of the material to maintain its RI characteristic with any form of wave of the applied voltage. This means that the material possesses substantially no time lag, if any.

Figure 18:
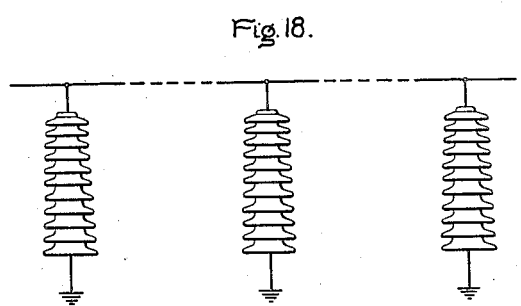

Fig. 18 shows the material in the form of a petticoat insulator. In this figure the insulator is shown as serving to support a line. The length of the insulator will vary, of course, with the voltage of the line to be insulated. The insulator is made preferably of units six inches in diameter.

Figure 19:
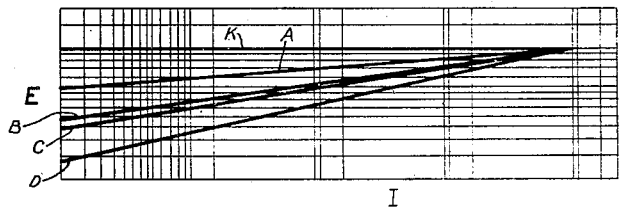

Fig. 19 shows the corresponding log-log volt-ampere (EI) curves of the units, the subject of the K, A, B, C, D, curves of Fig. 14.

Figure 20:
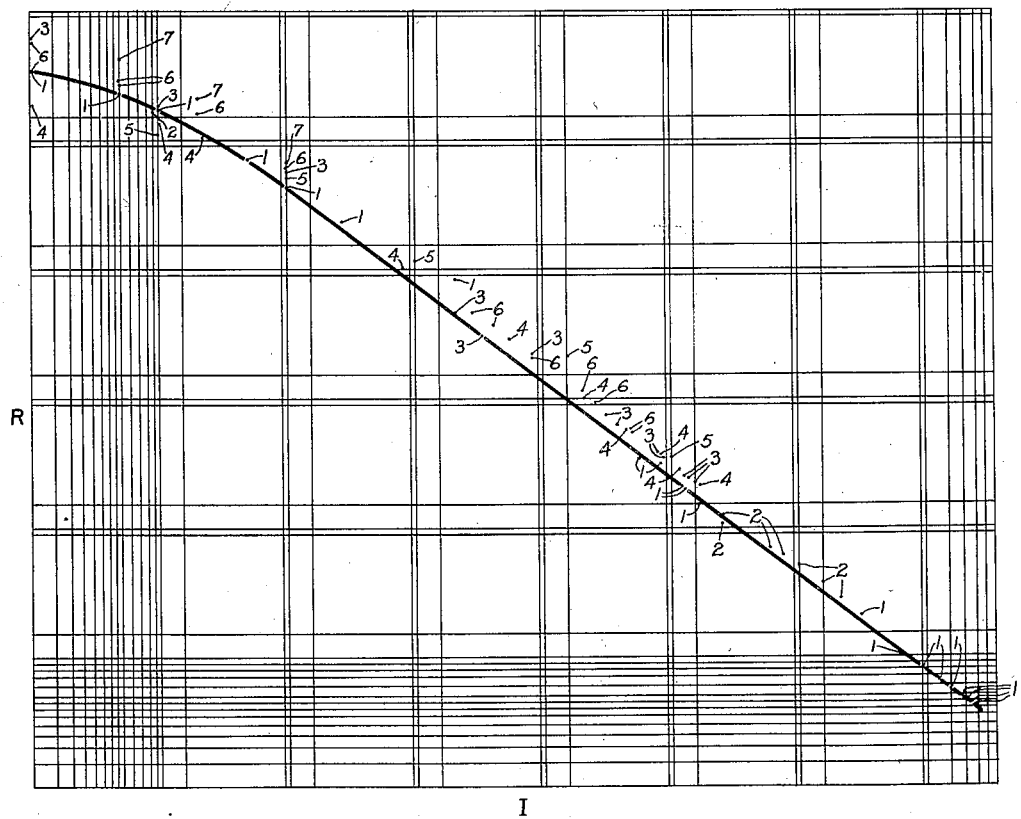

Fig. 20 is a log-log curve of a material of the invention showing the results of life test over a number of months with a current density of 19 milliamperes per unit disc. The group of points marked 1, 2, 3, etc. indicate tests taken at different times over a period of a year and a half. For example, points 1, 1, 1. etc. indicate one series of tests. Points 2, 2, 2, etc. indicate a later series of tests. Points 3, 3, 3, through which a line has been drawn, a later series, etc.

Figure 21:
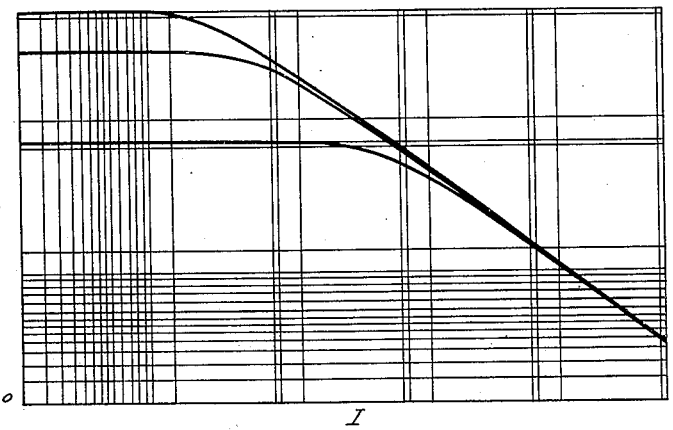

Fig. 21 is a calculated curve on log-log co-ordinates illustrating the effect of adding a conducting substance to a material having a hyperbolic RI characteristic and represents diagrammatically the effect of adding carbon to pure silicon carbide. The effect is as though the conducting material were in parallel with the material having the hyperbolic RI characteristic and will be called for convenience "the parallel resistance".

Figure 22:
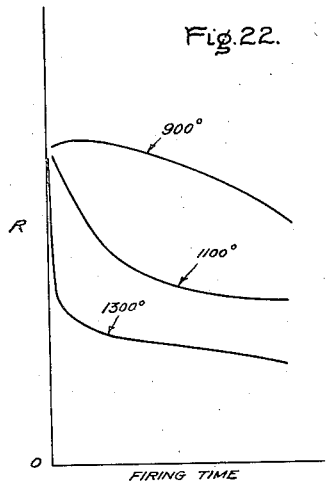

Fig. 22 shows the effect of time of firing on the constant of standard unit discs of standard make of the invention fired at 900°, 1100°, and 1300° C.

Figure 23:
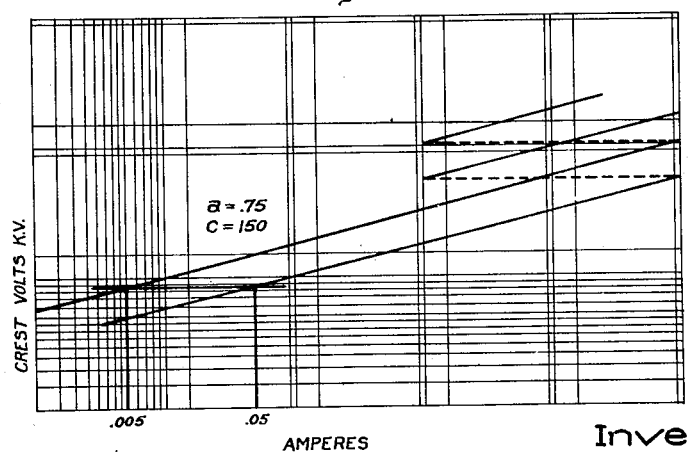

Fig. 23 shows two curves of a form of the material one having a leakage of 5 milliamperes and the other 50 milliamperes in terms of a standard unit.

Figure 24:
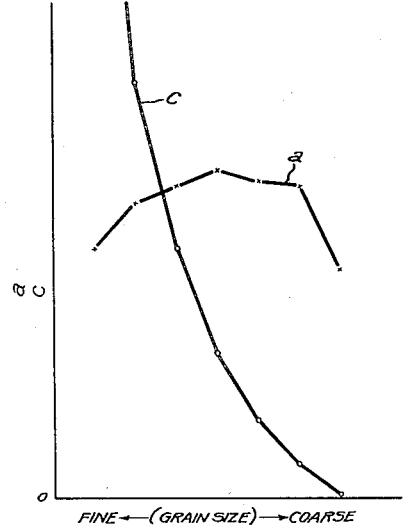

Fig. 24 shows curves indicating the general effect of grain size on the exponent $a$ and constant $c$ of a material having a hyperbolic RI characteristic and under a pressure of 14,000 pounds per square inch.

Figure 25:
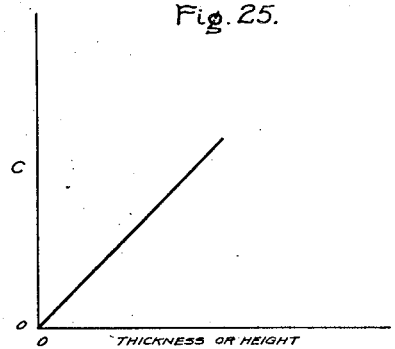

Fig. 25 is a curve showing the relation between constant and height of stack of standard units of a form of material of the invention.

Figure 26:
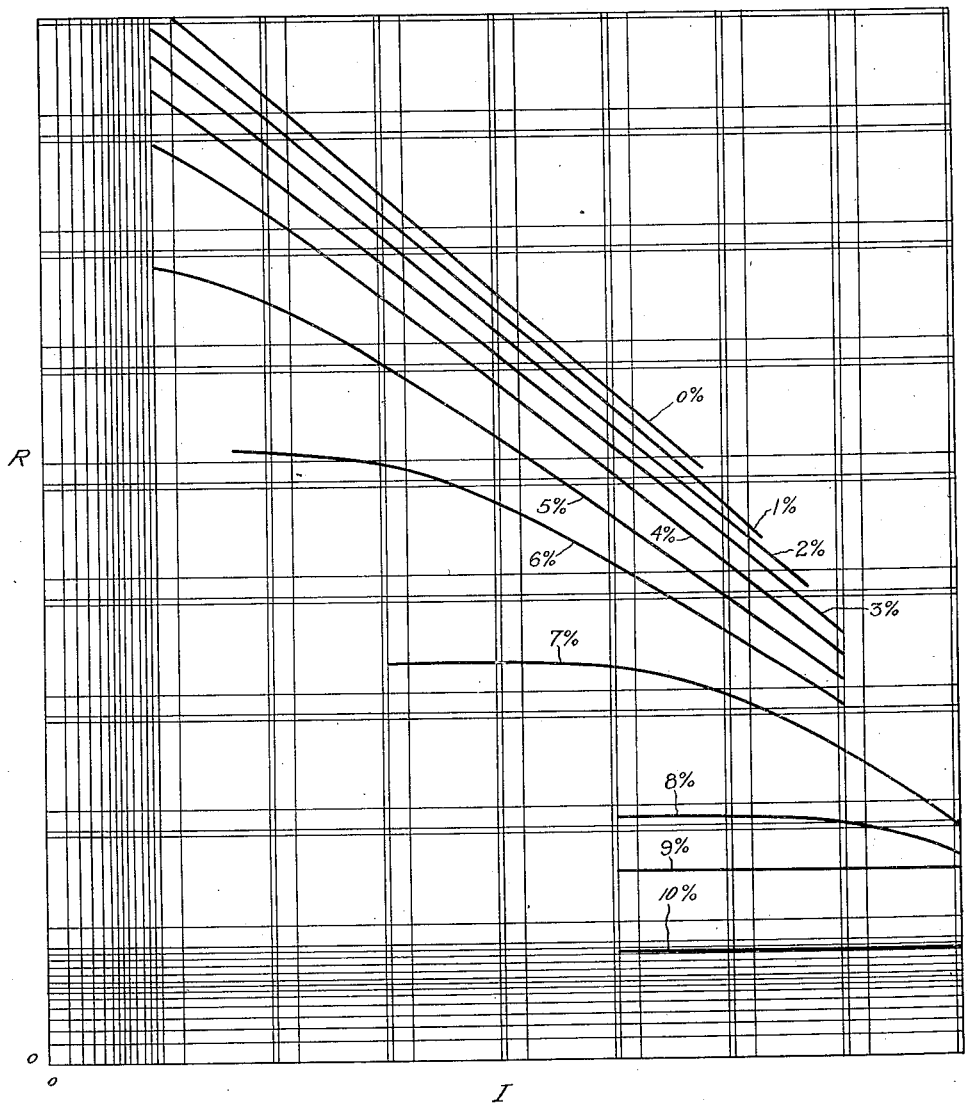

Fig. 26 shows the effect on the resistance-ampere characteristic of variation of carbon from 0% to 10%. The curves in this figure are log-log.

Figure 27:
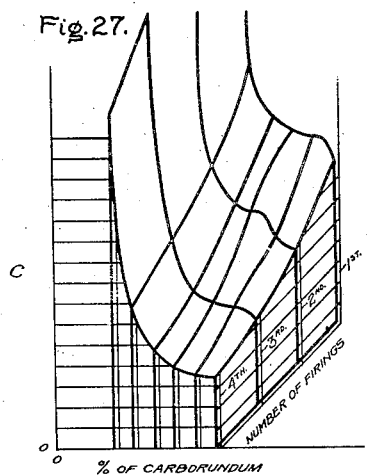

Fig. 27 shows with respect to three-dimensional rectilinear co-ordinates the general effect on $c$ of repeated firings of carborundum at 1300° C., the materials having different proportions of carborundum but always the same percentage of free carbon, namely, 2%.

Figure 28:
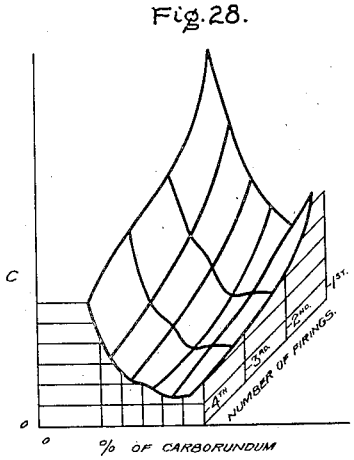

Fig. 28 shows with respect to three-dimensional rectilinear co-ordinates, the same thing with the free carbon maintained at 5%.

Figure 29:
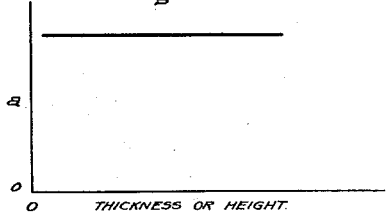

Fig. 29 shows a curve indicating the relation between the exponent and the height of stack of standard units of the invention.

Figure 30:
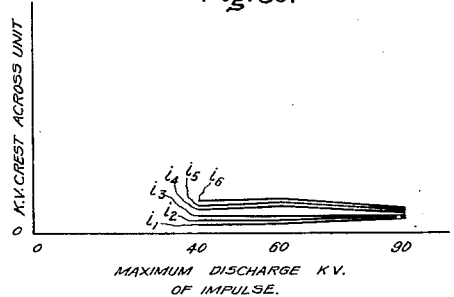

Fig. 30 shows on rectilinear co-ordinates the relation between voltage measured across a certain block of the material of the invention and the crest value of the voltage applied. The applied voltage is determined by the sphere gap setting of the impulse generator used in making the test for these curves and it can be stated roughly that the time required for the impulse to reach 40, 60 or 90 kv. was the same, which means that the 90 kv. wave was 90 over 40 times as fast as the 40 kv. wave. The circuit was controlled so as to keep the current constant through the disc and the curves for different current values indicate that the voltage across the material does not depend on the rate of voltage application but rather on the amount of current flow. Other types of arresters with the exception of the electrolytic type show increases in voltage across the arrester with increases of applied voltage.

Figure 31:
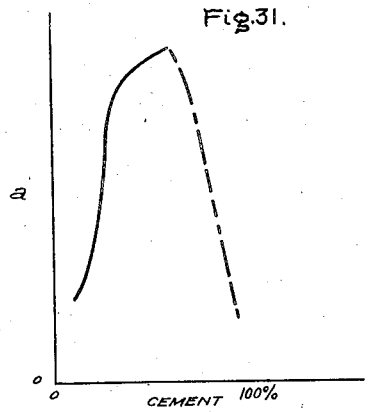

Fig. 31 shows the effect of different percentages of a cement binder on a material of the invention consisting of SiC and 9.5% of free carbon. The cement was allowed to set in the open and not under pressure.

Figure 32:
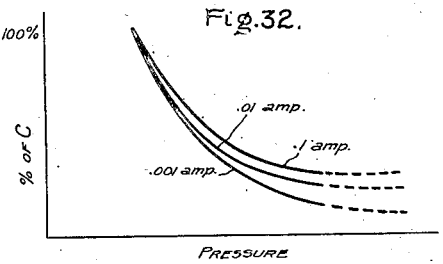

Fig. 32 shows the effect of pressure on the resistance of granular silicon carbide with different values of current, 9000 pounds per square inch being considered as 100%.

Figure 33:
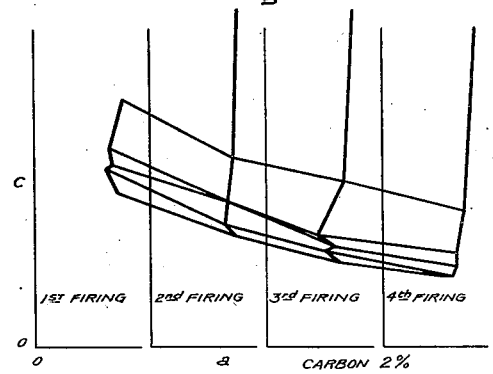
Figure 34:
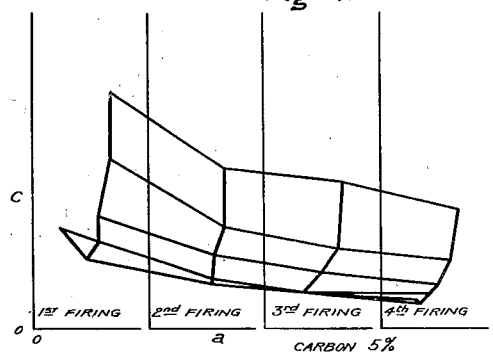

Figs. 33 and 34 show the effect of repeated firings on both the exponent and constant of standard units of a material of the invention, the clay of the units being 28% in one and 78% in the other figure and the carbon being 2% in one and 5% in the other.

Figures 35, 36:
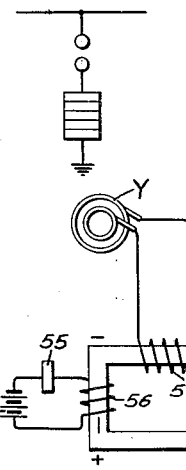

Fig. 35 is a device in which the material of the invention is used as a rectifier.

Fig. 36 is a modified form of the device of Fig. 35.

Figure 1:
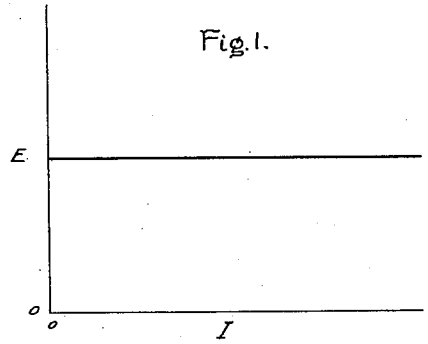
Fig. 1 shows a volt-ampere (EI) curve representing a material having the hyperbolic resistance ampere characteristic described in the foregoing.

My invention will probably be more easily understood by first considering an example of an arrester employing material of Fig. 1 having the characteristics of the invention and rated for a 3000 volt line (4200 volts crest value). At this voltage there is little or no leakage, but when a surge appears upon the line, current will begin to discharge at 8 kv. The material will hold the voltage at or about this point irrespective of the volume of current flow until the surge disappears.

Figure 2:
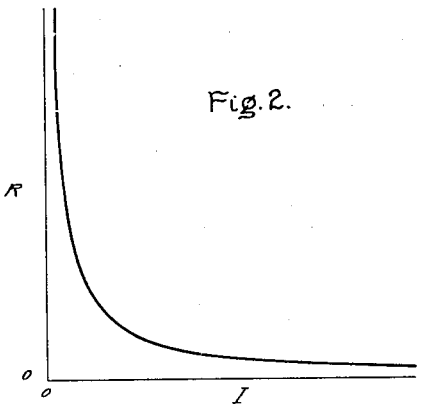
Fig. 2 shows the resistance-ampere (RI) curve of the same material. The curve is a hyperbola and for that reason the characteristic is said to be hyperbolic.
Figure 3:
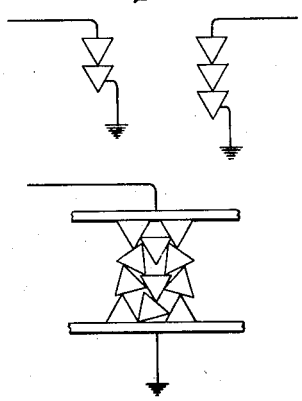
Fig. 3 shows a device consisting of two or more crystals of the same material of the invention in contact. This device preserves the hyperbolic characteristic whether the current flows in one direction or in the reverse direction, that is, regardless of the polarity of the potential applied.

Inasmuch as the material of Figs. 1 and 2 holds the voltage constant, the equation of the curve of the material will be $$RI = E = c \quad (2)$$

Figure 4:
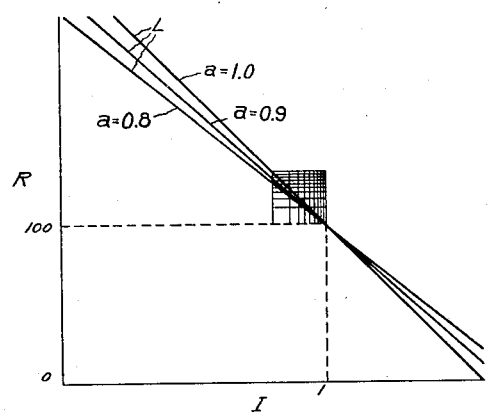
Fig. 4 shows RI curves with reference to log-log co-ordinates, of three different forms of material of the invention. The slope or exponent of one is unity, of another 0.9 and of the third 0.8.

That being the case, that is, inasmuch as $E = c$, a constant, if the RI curve is laid off with respect to logarithmic co-ordinates, it will assume the form of a straight line at 45° with respect to the current axes, as indicated by line L marked "$a = 1.0$ in Fig. 4."

Inasmuch as the slope of this line with respect to the current axis is 1, the exponent $a$ will equal 1.0. However, the hyperbolic characteristic of a material of the invention may be preserved without having a constant voltage as will more fully appear. For example, the more general form of the equation as already indicated is $$RI^a = c \quad (3)$$

Therefore, if the slope of the line in Fig. 4 is 0.9, the equation for that particular slope will be $$RI^{0.9} = c \quad (4)$$

which indicates, of course, that while the voltage is not constant it preserves the hyperbolic characteristic. If the current in these equations is assumed to be of a value of 1 ampere, then R will equal $c$, regardless of the slope of the line.

Inasmuch as the resistance of such a material varies as the current varies, I have adopted the expedient of comparing different materials having different slopes $a$ by comparing their resistance values at a given current value, as for example, one ampere. Obviously, at that value of current, $R=c$ and, for convenience and to distinguish from the resistances at other values of current, I will refer to $c$ as the constant, as previously indicated. With this explanation it will be understood what I means when I say that R in the Equations (1), (2) and (3) is equal to the constant $c$, regardless of the exponent $a$, that is, regardless of the slope of the line.

The corresponding EI equation for the material represented in Fig. 2 can be obtained from the resistance-ampere equation $RI^a=c$ by substituting for R the value $$\frac{E}{I}.$$

The equation then becomes $EI^{(a-1)}=c$. Obviously, therefore, when $a$ becomes 1, $E=c$. On the other hand, if $a$ becomes 0, the exponent of I becomes $-1$ and the left-hand side of the equation becomes $$\frac{E}{I};$$

therefore, the equation reduces to $R=c$. Similarly, and referring to equation $RI^a=c$, if $a=0$, then $R=c$.

Figure 7:
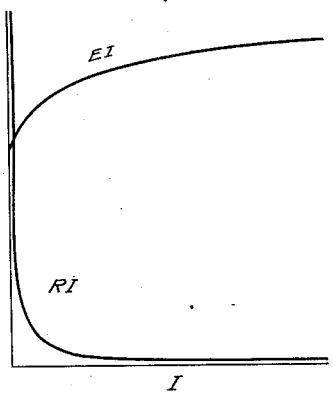
Fig. 7 shows both RI and EI curves superimposed of a form of material of the invention.
Figure 8:
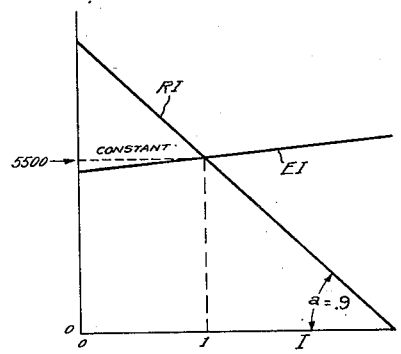
Fig. 8 shows RI and EI curves of the same material with reference to log-log co-ordinates. It will be seen that the exponent is 0.9 and the constant at one ampere is 5500.

The material, the curves of which are shown in Figs. 7 and 8, has a constant $c=5500$ and an exponent $a=0.9$. The volt-ampere equation, therefore, becomes $EI^{-0.1}=5500$ and the RI equation becomes $RI^{0.9}=5500$. Inasmuch as in the EI equation when $I=1$, E becomes 550, and inasmuch as in the RI equation when I becomes 1, R becomes 5500, it follows that both curves will pass through the point $R=5500$.

The material, the curve K of which is shown in Fig. 14, has a slope $a$ equal to 1 and it passes through the 1000 ampere, 10 ohm, point. This line also passes through the point 1 ampere and 10,000 ohms and, therefore, indicates a constant $c$ of 10,000, which corresponds to a given length of material. If the length is reduced to $\frac{1}{5}$ the constant is reduced to $\frac{1}{5}$ or to 2000 as indicated by curve K'. However, the slope is he same, which means that curves K and K' are parallel. In this same figure the four other curves A— B— C— D— have respectively slopes $a$— .91— .87— .82— .74. These curves all pass through the 1000 ampere point.

Although the material of the invention has a hyperbolic RI characteristic, the region within which the effective slope appears when in the form of a resistance element, or a discharge device, is not always the same (see Fig. 26) and it is one of the objects of my invention to prepare such material so that the constant and the slope can be given desired values. The exponent can be controlled by controlling the free carbon ingredient or by firing the material, or by controlling the grain size, or by varying the binder. Also the constant can be controlled by controlling the pressure or by varying the free carbon ingredient or by firing, or by varying the grain size.

I find that a material of the invention of a composition which I will for convenience designate as of standard make may be made as follows: For convenience I take carborundum having a percentage of free carbon of less than 4% and of a grain size which passes through a sieve mesh of the order of 250 and which for convenience I will designate as grains of standard size. This granular carborundum is then mixed with a binder. This binder is preferably ball clay, of the pencil clay variety. The grain size of the clay is preferably the same as that of the carborundum. The proportions of the ingredients are as follows: Equal parts of clay and carborundum and sufficient free carbon in the form of graphite to bring the total free carbon content of the mixture to 4%. These ingredients are thoroughly mixed together. Water is now added and again thoroughly mixed. The amount of water added for this wet "mix" is preferably about 70% by weight of the dry ingredients. After the wet "mix" has been thus prepared it is spread out in pans to dry. The drying process can be carried out in any suitable manner, as for example, by heating or by passing a current of air over the material by means of a blower. The heating may be done by placing the material in an oven and the temperature raised to about 140° C.

After the material is dried it is broken up so as to allow it to pass through a 20 mesh screen, after which water is added again, the amount of water now being about 3% by weight of the solid material, and mixed again until uniformly damp. This product is now moulded into standard unit size under a pressure of from 14,000 to 18,000 lbs. per sq. inch. After the units are thus formed they are dried for about five days by allowing them to stand in the open. They are then fired at about 900° C. in a reducing or neutral atmosphere and allowed to cool. This entire operation may require six hours more or less.

The units at the end of this time are heated in an oven in a reducing or neutral atmosphere, as for example in a carbon tube furnace, at a temperature of about 1300° C. for about an hour.

The preliminary 900° fire is made in a wire wound electric furnace and sufficient energy applied to bring the material up to a temperature of 900° in three hours. The furnace is then allowed to cool requiring a time of at least three hours. During this firing operation the material of the invention is embedded in powdered coke.

The second firing operation is done in a carbon tube electric furnace the material passing through in continuous motion requiring one hour to pass a total distance of four feet. Thermo couples located 6″ from either end of the furnace and in the middle indicated temperatures of the order of 650°, 1050° and 1300° C. reading the thermo couples in the order of the direction of travel of the material. Leaving the carbon tube the material is passed into a cooling tube so that strains are not set up in the material due to too rapid cooling.

The following is a table of $a$, $c$ and parallel resistances of three lots of standard material in the form of standard units:

| Lot | $a$ | $c$ | R |
|---|---|---|---|
| 509 | .73 | 110 | 45000 |
| 552 | .73 | 145 | 18200 |
| 573 | .73 | 145 | 25000 |

In order to provide good electrical contact between the discs when they are stacked the surface of each of the discs or units after the process above described is coated with metal, as for example by some suitable spraying process.

Figure 5:
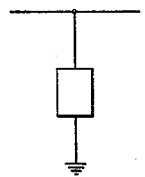
Fig. 5 is a diagrammatic representation of a form of discharge device consisting of a stack of standard units of material of the invention without a gap.
Figure 6:
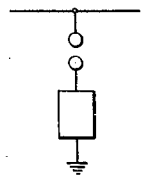
Fig. 6 shows the discharge device of Fig. 5 with a spark gap.

In making an arrester one or several discs or units may be used. Where several are used the units are stacked in a pile, as indicated in Figs. 15 and 16, and electrical connections made with the ends of the pile. On the other hand, a single block, equal in length or height to several standard unit discs may be used, as indicated in Figs. 5 and 6.

I find, however, that the resistance material of the invention may be made by varying the proportions of the ingredients or their grain size; by varying the pressure; by varying the temperature; or by varying the time in connection with the various steps in the process. For example, I find that cement, lead borate or glass (preferably powdered glass) may be substituted for the clay, the essential quality of the binder in any event being that it be a good non-conductor. The choice of the binder will depend upon the physical, mechanical, chemical or electrical properties desired in the finished product. For example, if it is desired that the material be non-hygroscopic, the glasses are preferred. Also the temperature of the heat treatment may dictate that glass be employed. On the other hand, if no heat treatment is desired, cement can be used, and so on.

With reference to the free carbon content as an ingredient, I find that carborundum may be used having the proper per cent of carbon in the first instance. If, however, the free carbon content of the carborundum is too low graphite or lamp black may be added to the mixture.

I find that the percentage of free carbon content of the material of the invention may be varied considerably above or below 4%. The carbon content, for example, may be reduced to zero or approximately zero, or raised to within the neighborhood of 8%, 9% and higher. For example, a mix may be used of 50% clay and 50% carborundum with no carbon content, or 50% clay and 50% carborundum, the latter having a free carbon content of 2 per cent or 4 per cent or 8 per cent, etc. Instead of having a 50—50 percentage of clay and carborundum the "mix" may be 60 per cent of clay and 40 per cent of carborundum, the latter having the same percentage of free carbon above indicated.

When lamp black is substituted for graphite only one-fifth the amount should be used. For example, in place of 5% of graphite one per cent of lamp black will take its place.

While I have stated above that the amount of water added to the original mix is about 70% by weight for the unit of standard make and material, I find that this amount may be substantially varied, for example, this proportion may be doubled or even trebled. On the other hand, the water may be reduced substantially below 70%.

While I have specified a temperature of 140° C. for drying the material in the manufacture of the units of standard make and material I find that this temperature can be substantially varied.

While I have specified a grain size for the ingredients of the order of 250 I find that this can be substantially varied and also that the size of the broken material after the drying process need not be confined to a 20 mesh screen.

It will be understood that the resistance material may be made in forms other than that of standard unit disc, for example, it may be made in blocks, rods, or any other desired form. Also, in moulding the material the amount of pressure used may be substantially varied from that specified. The pressure in any event should be sufficient to bring the constant of the material to the point desired and to insure stability and uniformity in the characteristics of the material.

I also find that the temperature used in the carbon tube furnace may be varied. The temperature may be increased or decreased and it may be desirable to increase the time of heating in the furnace, and vice versa.

The firing tests listed below indicate the effect of time and temperature. The same kind of material was fired at three different temperatures. In each case the percentage of clay, carborundum and free carbon was the same.

| Firing temp. ° C. | Firing time min. | Exponent | Constant | Parallel resistance |
|---|---|---|---|---|
| 900 | 0 | .67 | 2,900 | 200,000 |
| 900 | 15 | .68 | 3,000 | 200,000 |
| 900 | 30 | .68 | 2,800 | 160,000 |
| 900 | 60 | .68 | 2,400 | 70,000 |
| 900 | 120 | .70 | 980 | 25,000 |
| 1,100 | 0 | .67 | 2,700 | 140,000 |
| 1,100 | 15 | .75 | 900 | 60,000 |
| 1,100 | 30 | .75 | 800 | 50,000 |
| 1,100 | 60 | .74 | 350 | 120,000 |
| 1,100 | 120 | .74 | 320 | 90,000 |
| 1,300 | 0 | .64 | 3,500 | 110,000 |
| 1,300 | 15 | .74 | 250 | 100,000 |
| 1,300 | 30 | .68 | 260 | 50,000 |
| 1,300 | 60 | .70 | 220 | 80,000 |
| 1,300 | 120 | .67 | 160 | 20,000 |

It will be seen therefore that the constant is materially affected. In this connection attention is directed to Fig. 22 which also indicates the variation of the constant.

The effect of adding graphite to the mixture of clay and carborundum is indicated in the following tables and in Fig. 26. The value of the parallel resistance is obtained under condition of very small current flow, and corresponds to the resistance of the material along the portion of the curve parallel to the current axis. See for example Fig. 21.

| Total est. free carbon | Exponent | Constant | Parallel resistance |
|---|---|---|---|
| .5% | .87 | 600 | 1,500,000,000 |
| 1.0 | .86 | 530 | 1,000,000,000 |
| 1.5 | .82 | 600 | 1,000,000,000 |
| 2.0 | .83 | 440 | 40,000,000 |
| 2.5 | .82 | 440 | 10,000,000 |
| 3.0 | .81 | 400 | 10,000,000 |
| 3.5 | .82 | 370 | 10,000,000 |
| 4.0 | .80 | 310 | 7,000,000 |
| 4.5 | .80 | 250 | 2,000,000 |
| 5.0 | .78 | 220 | 1,000,000 |
| 5.5 | .71 | 150 | 100,000 |

Obviously therefore from what has been pointed out when the desired exponent is obtained by the addition to the material of free carbon, such as graphite, if the constant is too high it may be brought down to the proper point by refiring. Also it will be seen that by adding graphite to carborundum the exponent $a$ of the resulting material exhibits a decreasing value along the upper extremity of the curve, that is, as the volume of current approaches very small densities, as indicated in Figs. 21 and 26. This decrease in the exponent resembles closely as heretofore indicated the effect of connecting with the material having a hyperbolic characteristic a resistance material having a constant resistance. The parallel-resistance can be measured at a current value where the exponent of the mixture has become zero or substantially zero and the resistance substantially constant.

In place of carbon I find that some metals in a finely divided condition, such as copper, chromium or tungsten may be substituted as indicated in the following table:—

Clay, carborundum and conducting material preferably of 250 mesh.

| Carborundum 250 mesh (.20) % | Added conducting material % | Pressure lbs. per sq. inch | $a$ | $c$ |
|---|---|---|---|---|
| Lot 40 | 10 | 18,000 | .77 | 350 |

That pressure does not affect the exponent of the material to a very great extent may be demonstrated by using quick setting cement as a binder with carborundum having a free carbon content of 4% for example. Units of standard size of this material were pressed at 14,000 lbs. to the square inch and allowed to set at atmospheric pressure. Other units of the same size and material were pressed at 14,000 lbs. the pressure being maintained for eighteen hours during the setting of the cement. The units that were allowed to set under pressure had a constant of 290 and an exponent of 0.78, whereas the units that were allowed to set after the pressure was removed had a constant of 370 and an exponent of 0.78. The curves, Figs. 7 and 8, also show that while increase of pressure will decrease the constant it will not substantially affect the exponent.

I find that a relation exists between the exponent and constant of the material of the invention which is indicated in Fig. 12. This curve is for a particular form of the material but illustrates the general principle. From the curve it will be seen that with a low constant the exponent varies at a greater rate while with a high constant the reverse is the case. The values for this curve were taken from the curves A, B, C, D, of Fig. 10. The curves of Fig. 10 it will be understood are based upon stacks of the material having a length 50% in excess of the length established for a given voltage by the curve of Fig. 9.

Of course, in an arrester the stack of the material must be long enough so that the arrester will neither flashover nor puncture at or about the breakdown voltage of the line. For example, assume that the maximum current to be discharged through an arrester connected to a line rated at 10 kv. shall never exceed 1000 amperes and further assume a factor of safety of 50%. If the material of the invention has an exponent $a$ of 0.74 the arrester should have such a length that it will neither flashover nor puncture at a voltage of less than 15 kv. (See Fig. 9.) If the maximum current to be discharged is to be less than 1000 amperes then consequently the resulting voltage will be less than 15 kv. In that case the length of the material can be shortened, and the resistance per unit length made higher. Conversely, if the material is to be operated at a current higher than 1,000 amperes, and consequently at a higher voltage, then it will be necessary to increase the length of the path to prevent arc-over or puncture and the resistance must be lower per unit length.

Increasing the cross section of a material so that the area of discharge path is greater will reduce the resistance per unit length of path if the exponent $a$ is zero and the resistance will vary as the reciprocal of the area. But, as the exponent rises above zero and approaches 1.0, an increase in area will have a decreasing influence on the resistance and with an exponent of 1.0, variation of the area will have no effect.

Failure tests have been made in connection with the material of the invention by using a potential at 60 cycles of 3000 volts from a power generator for example, and by applying an impulse simultaneously from an impulse generator. In every test of this kind made on the material it was found that the presence of the impulse had no effect whatever on the flow of power generator current through the material, or discharge device, or arrester. In fact, if at the voltage used, no current was observed on the oscillograph record without the impulse, then no current would be found when using the impulse, except of course the kick of the vibrator due to the impulse itself. If the 60 cycle voltage is raised until a current deflection can be seen on the film, then exactly the same current flows in a cycle where no impulse was used.

Since the conditions under which current will flow can be calculated due to the characteristics of the material of my invention, it is possible to predict accurately the value of current which will flow following the impulse, as, for example, when this material is used in connection with a gap. In such a case the impulse may be considered as acting as a switch which applies to the material, for example, a certain definite 60 cycle voltage, the resulting current from which can be calculated. As far as I am aware it has never been possible to do this prior to my invention. Of course, it will readily be understood that the question of determining the current due to the application of any one of a series of different voltages is in no way appreciably affected by the presence or absence of a gap. Therefore, the current that will pass through an arrester which uses the material of my invention can be predetermined regardless of whether the gap is used or not.

While the material of the invention may be readily formed into units by the use of a binder as an ingredient, as described in the foregoing, carborundum without a binder may be used as a lightning arrester without such ingredient. For example, a carborundum mass of suitable grain size and of proper free carbon content may be placed in a container (such as a container of insulating material) having a bore in which the mass held together may or may not be compressed. Within this bore a metal element is placed at either end of the column of carborundum crystals located therein, said plates serving as terminals. The carborundum crystals and the terminals may be compressed together by any suitable means until the proper pressure is obtained which will insure stability of characteristic and which will insure a predetermined constant. If a pressure is applied then after applying pressure to the mass of crystals the container may be placed in a device such as a press, the screw of which may be used to tighten the plates together and to thereby compress the crystals to the degree desired. The range of pressure may extend from zero to the larger pressures already indicated such as of the order of 14,000 lbs. per sq. inch. While the constant is readily affected by the pressure to bring it to the point desired, the exponent is determined by the free carbon content of the carborundum as heretofore indicated.

The carborundum as received from the manufacturer may contain varying degrees of carbon. It may also contain free silicon. If the free carbon content or the free silicon content, or both, of the carborundum received is too great for the desired characteristics of the arrester, it becomes necessary to reduce either or both. In the case of free carbon this is preferably done by removing practically all of the free carbon, that is, by reducing the free carbon content to about 0.2% or less, and adding sufficient graphite or lamp black to bring the free carbon content to the desired point. I find that an effective way of doing this is by roasting the carborundum at a temperature of about 900° C. in an atmosphere of oxygen until the carbon content falls to 0.2% or under. However, the same result may be obtained, first, by treating, as for example, by fusing the carborundum with potassium chlorate or, second, by boiling in a mixture of hydrofluoric and nitric acid or, third, by boiling again in nitric acid with potassium chlorate or, fourth, by other suitable oxidizing method. The various methods give somewhat different results, but any method which will reduce the free carbon content without disturbing the composition of carborundum itself may be used. The removal of free silicon may be carried out in the same way. Therefore, the removal of the free carbon also removes the free silicon, converting it, for example, into silica.

As a matter of control, if the carborundum obtained from the manufacturer has a very small percentage of free carbon, it will not be necessary to resort to purification, but, if the carbon content is variable or is high, as for example, as high as 10% or over, then it will be necessary to reduce the percentage of carbon for purposes of uniformity to a low value, thereafter adding sufficient carbon, such as graphite, to insure the proper characteristic of the material. The same is true with respect to silicon.

It will be seen therefore that the invention contemplates taking crushed carborundum, sifting the crystals and thereby obtaining assorted crystals of a size determined by the mesh of the screen used. The invention also contemplates mixing the assorted crystals with free carbon.

The material of the invention furthermore has a characteristic represented by the equation $RI^a = c$, as heretofore indicated, and the slope $a$ of the curve representing this equation may be made of suitable value in the region corresponding to densities of current varying from 1 to 1000 amperes and over, per square inch of the material.

The material of the invention furthermore possesses the characteristic that a constant for a mass of material of the dimensions of a standard unit may be made to vary from 40 to 500.

Therefore, I obtain by the method of my invention materials having various exponents coupled with various constants, as for example, a material having $a = 0.78$, and $c = 145$, or $a = 0.82$ and $c = 220$, and so on.

Therefore, it will be seen from the foregoing; that the pressure used in connection with the material of the invention which holds the grains together insures that the carborundum crystals shall come into and me maintained in contact; that thoroughly mixing the ingredients insures a thorough mingling of the free carbon content of the material with the carborundum crystals; and that by the use of thoroughly mixed ingredients under proper pressure, stability of the characteristic of the material is insured. Further assorting of the grains of the material insures uniformity of the mass and enables the duplication of units with the same and substantially permanent electrical characteristics. The material of the invention has substantially no deterioration or disintegration. For example, a unit of the material of the invention may be subjected to a series of several thousand discharges at a density each of 500 amperes or over per square inch with safety and without any fear of seriously affecting the material. At any rate, if there is a variation of the constant there is a compensating variation of the exponent and vice versa as indicated by the curve in Fig. 12.

The subject matter of the invention therefore is such that it may be used for the purpose of discharging current as high as 200 amperes and over per square inch for an indefinite number of times without any danger of deterioration.

It will be seen, therefore, that the invention relates to a material which will operate very effectively as a lightning arrester in the usual and generally accepted term, the function of which arresters is to protect terminal equipment, that is, switch gear and transformers or other apparatus located at substations or generating stations. I will now point out that this same material may be used in a novel manner. Inasmuch as under normal operating conditions the material of the invention is an insulator, it may be used to take the place of the line insulators as they have been used heretofore. When so used the insulators themselves will each serve as a protective device which will permit discharges of current to take place with variation of voltages upon the line when such voltages begin to reach dangerous values or values substantially higher than those of the normal operating voltages. For example, assuming that a line system is protected with insulators made of the material of the invention of the type having for example an exponent of 0.75 and with a constant in terms of unit standard discs of 150, at normal operating voltage the leakage on such line may be as high as 50 milliamperes without serious objection. But, if due to lightning or other cause the voltage between the line and ground rises to a voltage value for example equal to from eight to nine times the normal line to line voltage (measured in effective volts) a discharge may take place through each of the insulators of a density of about 40 amperes per square inch. On the other hand, if a material having a lower leakage at normal operating line voltage is used, as for example, a leakage of 5 milliamperes in terms of a unit disc, the discharge through each insulator under the same excess voltage conditions would be in the neighborhood of 4 amperes per square inch. In Fig. 23 I have laid off on log-log coordinates the EI curves for the two conditions, namely, for the conditions of 50 milliamperes leakage and 5 milliamperes leakage. It will be understood that the voltage at which leakage is determined is the line to ground voltage, that is, line to line voltage divided by $$\sqrt{3}.$$

If, however, the exponent be increased to 0.80 then the discharges will be 400 and 40 instead of 40 and 4. The leakage, however, will be the same in either case. With such a system it is possible to drain from the transmission lines large volumes of current during periods of over-voltage without any flashing over. The insulators heretofore used in the art have a definite flashover voltage under impulse conditions with a certain prescribed wave and any voltage in excess of this causes the line insulator to flash over and is quite certain to result in an interruption to service. But for any voltage less than this value the insulator heretofore used has not aided in eliminating the dangerous charge from the system to ground and therefore has in no such sense been a protector.

In the foregoing I have confined my discussion more or less to the use of silicon carbide and to the use of silicon carbide with other ingredients, but other materials may be used in place of silicon carbide, such for example as, zincite, galena, psilomelane, and other crystalline materials having a similar characteristic. Some of these crystals are used in the radio art as detectors. As a conducting material for the purpose of affecting the exponent, the following ingredients may be used: tellurium, tungsten, cobalt, nickel, molybdenum, iron, silicon and the like. I find that the material may be made by combinations of such ingredients as tellurium and zincite, silicon carbide and iron pyrite, silicon carbide and galena, and silicon carbide and zinc oxide. For example 1% of tellurium with zincite will give a material having an exponent of 0.88 and a constant of 400; 75% of silicon carbide with 25% of iron pyrite will give a material having an exponent of 0.74 and a constant of 560; 75% of silicon carbide and 25% of galena will give a material having an exponent of 0.8 and a constant of 1500; 75% of silicon carbide and 25% of zinc oxide will give a material having an exponent of 0.7 and a constant of 4000; and so on. The same rules will apply for affecting the exponent and the constant by the use of binders, by fixing the grain size, by fixing the pressure, and by fixing the amount of conducting material which is to serve as a parallel resistance.

It will be understood that I do not wish to be limited to the materials that I have specifically enumerated in the specification, inasmuch as the invention relates to any of the materials that have high resistivity with low voltages and a high degree of conductivity in the presence of high voltages. The invention relates to any materials having these characteristics, the exponent of which may be fixed or controlled as heretofore indicated, and the constant of which may be fixed or controlled as heretofore indicated. As far as I am aware, it is new to make use of such materials as I have indicated. There is nothing in the art prior to my invention that teaches that the exponent and constant of such materials may be regulated, or that teaches that it is possible to prepare such material in such a manner that the character of the material can be predetermined or that units may be made with the assurance that they will be duplicates, or substantial duplicates of each other. I am the first one to point out that the exponent and the constant may be definitely controlled and regulated, to point out that crystals of such materials may be brought into direct contact to produce a discharge device possessing the characteristics indicated in the foregoing regardless of the direction of flow of the current or the polarity of the potential applied. I am the first to teach that the exponent and the characteristic may be fixed by the grain size, or by the pressure, or by the use of a conducting material as an ingredient or by the use of a binder.

Not only may the device of the invention be used for resistance purposes and for discharge purposes, as heretofore indicated, but it may also be used for the purpose of rectifying alternating currents and for charging storage batteries and the like. Fig. 35 shows a device in which the material is so used. In this device a source of alternating current X is connected in series with a winding 50 on a core 51. In series with the coil 50 and with the source of current X, I insert an element 52 of the material which may be in the form of a disc, block, or the like. In series with the element 52 is inserted the storage battery 53 for the purpose of charging the latter. In this device this core 51 must be magnetized. Therefore the core is in the form of a permanent magnet as indicated by the marks + (plus) and − (minus) located at the corners. However, the core 51 may be the core of an electromagnet with a winding connected to a suitable source of direct current for maintaining the electromagnet energized and the core polarized magnetically.

In Fig. 36 I have shown a modified form of the device, in which figure the battery 54 to be charged and the rectifying element 55 are connected to a coil 56 separate and independent from the coil 57 which is connected to the source of alternating current Y.

Therefore, I do not wish to be limited to the specific materials or devices or method specifically described in the foregoing, inasmuch as in view of the disclosed either of these may be varied without departing from the spirit of the invention or from the scope of the claims contained herein.

What I claim as new and desire to secure by Letters Patent of the United States, is:

1. A discharge device including crystals of a particular material connected in contact one with another and adapted to be connected between points having a difference of electric potential, and a conducting material mixed with said crystals, said device having the same hyperbolic resistance-ampere characteristic with respect to current flow between said points in either direction.

2. A lightning arrester including a mass of assorted crystals, said mass having a hyperbolic resistance-ampere characteristic which is substantially unaffected by variations in the rate of change of voltage applied to the mass to produce a flow of current therethrough.

3. A lightning arrester including a mass of assorted crystals, said mass having a characteristic represented by the equation $RI^a=c$; where R is the resistance of the mass, I is the density of the current through the mass of between 1 and 200 amperes per square inch, $c$ is a constant and $a$ is the slope of the curve represented by the said equation when plotted with respect to logarithmic co-ordinates.

4. A granular material having a hyperbolic resistance-ampere characteristic and having free carbon as an ingredient, and means for holding the grains together under pressure, whereby in terms of a unit of the dimensions of the standard unit the material has a constant between 50 and 5000 and an exponent of 0.2 and over when serving as a conductor of current of a density of 5,000 amperes per square inch and under.

5. A mass of crystals of a particular material, means for holding said crystals in contact in the form of a unit capable of discharging without injury a current of one ampere and over, and carbon as an ingredient mixed with the crystals, the percentage of the carbon ingredient being such that when the crystals are held together by a suitable pressure the exponent is 0.2 and over with a density of current of less than 700 amperes to the square inch.

6. A resistance material including a mass of silicon carbide crystals, and a binder holding adjacent crystals in contact, said material having a hyperbolic resistance characteristic which is unaffected by variations in the rate of change of voltage applied to the material to produce a flow of current therethrough, the resistance of the material being always substantially the same for a given density of current flowing through it whether the value of the said current density is attained by increasing or decreasing the current flow.

7. A resistance material including a mass of silicon carbide crystals, and a binder mixed with conducting material, said binder holding adjacent crystals in contact, said material having a hyperbolic resistance characteristic which is unaffected by variations in the rate of change of voltage applied to the material to produce a flow of current therethrough, the resistance of the material being always substantially the same for a given density of current flowing through it whether the value of the said current density is attained by increasing or decreasing the current flow.

In witness whereof, I have hereunto set my hand this 9th day of June 1927.

KARL B. McEACHRON.